(12) United States Patent
Pilebro

(10) Patent No.: US 9,791,217 B2
(45) Date of Patent: Oct. 17, 2017

(54) ENERGY STORAGE ARRANGEMENT HAVING TUNNELS CONFIGURED AS AN INNER HELIX AND AS AN OUTER HELIX

(71) Applicant: Skanska Sverige AB, Stockholm (SE)

(72) Inventor: Hans Pilebro, Enebyberg (SE)

(73) Assignee: SKANSKA SVERIGE AB, Stockholm (SE)

( * ) Notice: Subject to any disclaimer, the term of this patent is extended or adjusted under 35 U.S.C. 154(b) by 0 days.

(21) Appl. No.: 14/439,737

(22) PCT Filed: Nov. 1, 2013

(86) PCT No.: PCT/SE2013/051279
§ 371 (c)(1),
(2) Date: Apr. 30, 2015

(87) PCT Pub. No.: WO2014/070094
PCT Pub. Date: May 8, 2014

(65) Prior Publication Data
US 2015/0276325 A1    Oct. 1, 2015

(30) Foreign Application Priority Data

Nov. 1, 2012  (SE) ........................... 1251238

(51) Int. Cl.
*F24J 3/08* (2006.01)
*F28D 20/00* (2006.01)
*F28D 1/047* (2006.01)

(52) U.S. Cl.
CPC ....... *F28D 20/0034* (2013.01); *F28D 1/0472* (2013.01); *F28D 20/0043* (2013.01);
(Continued)

(58) Field of Classification Search
CPC ............... F28D 20/0034; F28D 1/0472; F28D 20/0043; F28D 20/0052; Y02E 60/142; Y02E 70/30
(Continued)

(56) References Cited

U.S. PATENT DOCUMENTS

| | | | |
|---|---|---|---|
| 1,639,172 A * | 8/1927 | Forcada | F28D 1/0472 165/148 |
| 2,737,789 A | 3/1956 | Ruff | |

(Continued)

FOREIGN PATENT DOCUMENTS

| | | | | |
|---|---|---|---|---|
| AT | EP 2078913 A1 * | 7/2009 | ............. | F24J 2/0488 |
| CA | 2413819 A1 * | 6/2004 | ........... | F28D 1/0213 |

(Continued)

OTHER PUBLICATIONS

Riley, Alex. "BBC—Earth—A strange extinct animal made this giant stone corkscrew", Jul. 28, 2016. [Retrieved on Sep. 3, 2016]. Retrieved from the Internet: URL:<http://www.bbc.com/earth/story/20160727-extinct-giant-beavers-made-stone-corkscrews-instead-of-dams>.*

(Continued)

*Primary Examiner* — Ljiljana Ciric
(74) *Attorney, Agent, or Firm* — Kagan Binder, PLLC

(57) ABSTRACT

An arrangement for storing thermal energy has at least two tunnels (1a, 1b) for holding a fluid. The tunnels (1a, 1b) are connected to each other by at least one channel (2), such that fluid communication is allowed between the tunnels (1a, 1b). Each of the inner tunnel (1a) and the outer tunnel (1b) is configured as a helix, the inner tunnel (1a) forming an inner helix and the outer tunnel (1b) forming an outer helix.

16 Claims, 3 Drawing Sheets

(52) U.S. Cl.
CPC ........ *F28D 20/0052* (2013.01); *Y02E 60/142* (2013.01); *Y02E 70/30* (2013.01)

(58) Field of Classification Search
USPC .................................................. 165/10, 45
See application file for complete search history.

(56) References Cited

U.S. PATENT DOCUMENTS

| | | |
|---|---|---|
| 2,766,200 A | 10/1956 | Kaufman |
| 2,818,118 A | 12/1957 | Dixon |
| 2,986,095 A | 5/1961 | Namur |
| 3,097,694 A | 7/1963 | Kerver |
| 3,227,211 A | 1/1966 | Gilchrist |
| 3,402,769 A | 9/1968 | Doggett et al. |
| 3,427,652 A | 2/1969 | Seay |
| 3,448,792 A * | 6/1969 | Willis .................... F28D 1/0213 165/10 |
| 3,470,943 A | 10/1969 | Van Huisen |
| 3,580,330 A | 5/1971 | Maugis |
| 3,593,791 A | 7/1971 | Parker |
| 3,640,336 A | 2/1972 | Dixon |
| 3,679,264 A | 7/1972 | Van Huisen |
| 3,685,330 A * | 8/1972 | Funke .................... B21D 11/06 72/137 |
| 3,737,105 A | 6/1973 | Arnold et al. |
| 3,757,516 A | 9/1973 | McCabe |
| 3,786,858 A | 1/1974 | Potter et al. |
| 3,807,491 A | 4/1974 | Van Hulsen |
| 3,817,038 A | 6/1974 | Paull et al. |
| 3,857,244 A | 12/1974 | Faucette |
| 3,863,709 A | 2/1975 | Fitch |
| 3,864,208 A | 2/1975 | Van Huisen |
| 3,878,884 A | 4/1975 | Raleigh |
| 3,921,405 A | 11/1975 | Rosciszewski |
| 3,923,248 A | 12/1975 | Cresswell |
| 3,931,851 A | 1/1976 | Harris et al. |
| 3,939,356 A | 2/1976 | Loane |
| 3,943,722 A | 3/1976 | Ross |
| 3,957,108 A | 5/1976 | Van Huisen |
| 3,965,972 A | 6/1976 | Petersen |
| 3,967,675 A | 7/1976 | Georgii |
| 3,986,339 A | 10/1976 | Janelid |
| 3,986,362 A | 10/1976 | Baciu |
| 3,991,817 A | 11/1976 | Clay |
| 4,008,709 A | 2/1977 | Jardine |
| 4,030,549 A | 6/1977 | Bouck |
| 4,031,952 A | 6/1977 | Contour |
| 4,044,830 A | 8/1977 | Van Huisen |
| 4,047,093 A | 9/1977 | Levoy |
| 4,060,988 A | 12/1977 | Arnold |
| 4,073,045 A * | 2/1978 | Margen .................... B23P 15/26 165/129 |
| 4,078,904 A | 3/1978 | Galt et al. |
| 4,079,590 A | 3/1978 | Sheinbaum |
| 4,121,429 A | 10/1978 | Grennard |
| 4,137,720 A | 2/1979 | Rex |
| 4,139,056 A | 2/1979 | Schöll |
| 4,143,816 A * | 3/1979 | Skadeland ............ F24D 11/005 126/502 |
| 4,147,204 A | 4/1979 | Pfenninger |
| 4,157,730 A | 6/1979 | Despois et al. |
| 4,174,009 A | 11/1979 | Laing et al. |
| 4,194,856 A | 3/1980 | Jahns |
| 4,200,152 A | 4/1980 | Foster et al. |
| 4,201,060 A | 5/1980 | Outmans |
| 4,210,201 A | 7/1980 | O'Hanlon |
| 4,211,613 A | 7/1980 | Meckler |
| 4,219,074 A | 8/1980 | Hansen |
| 4,223,729 A | 9/1980 | Foster |
| 4,234,037 A | 11/1980 | Rogers et al. |
| 4,241,724 A | 12/1980 | Hull |
| 4,271,681 A | 6/1981 | Schertz |
| 4,286,141 A | 8/1981 | MacCracken |
| 4,286,574 A | 9/1981 | Vrolyk et al. |
| 4,290,266 A | 9/1981 | Twite et al. |
| 4,291,751 A | 9/1981 | Wolf |
| 4,297,847 A | 11/1981 | Clayton |
| 4,345,652 A | 8/1982 | Roque |
| 4,351,651 A | 9/1982 | Courneya |
| 4,361,135 A | 11/1982 | Metz |
| 4,363,563 A | 12/1982 | Hallenius et al. |
| 4,375,157 A | 3/1983 | Boesen |
| 4,392,351 A * | 7/1983 | Doundoulakis ....... F01C 11/004 165/169 |
| 4,392,531 A | 7/1983 | Ippolito |
| 4,399,656 A | 8/1983 | Laing et al. |
| 4,401,162 A | 8/1983 | Osborne |
| 4,415,034 A | 11/1983 | Bouck |
| 4,418,549 A | 12/1983 | Courneya |
| 4,440,148 A | 4/1984 | Assaf |
| 4,448,237 A | 5/1984 | Riley |
| 4,462,463 A * | 7/1984 | Gorham, Jr. .......... F28D 7/0066 165/140 |
| 4,476,932 A | 10/1984 | Emery |
| 4,479,541 A | 10/1984 | Wang |
| 4,498,454 A | 2/1985 | Assaf |
| 4,505,322 A | 3/1985 | Larson |
| 4,510,920 A | 4/1985 | Walmet |
| 4,566,527 A | 1/1986 | Pell et al. |
| 4,577,679 A | 3/1986 | Hibshman |
| 4,607,488 A | 8/1986 | Karinthi et al. |
| 4,632,604 A | 12/1986 | McKelvy |
| 4,633,948 A | 1/1987 | Closmann |
| 4,642,987 A | 2/1987 | Csorba et al. |
| 4,652,181 A * | 3/1987 | Bergman .................. G21F 9/34 376/272 |
| 4,671,351 A | 6/1987 | Rappe |
| 4,693,301 A | 9/1987 | Baehrle et al. |
| 4,723,604 A | 2/1988 | Emery |
| 4,867,241 A | 9/1989 | Strubhar |
| 4,912,941 A | 4/1990 | Büchi |
| 4,974,675 A | 12/1990 | Austin et al. |
| 4,977,961 A | 12/1990 | Avasthi |
| 5,074,360 A | 12/1991 | Guinn |
| 5,085,276 A | 2/1992 | Rivas et al. |
| 5,088,471 A * | 2/1992 | Bottum .................... F24J 2/44 126/628 |
| 5,507,149 A | 4/1996 | Dash et al. |
| 5,620,049 A | 4/1997 | Gipson et al. |
| 5,937,934 A | 8/1999 | Hildebrand |
| 5,941,238 A | 8/1999 | Tracy |
| 6,098,705 A * | 8/2000 | Kim ........................ F25B 39/04 165/163 |
| 6,138,614 A | 10/2000 | Shropshire |
| 6,199,515 B1 | 3/2001 | Clarke |
| 6,247,313 B1 | 6/2001 | Moe et al. |
| 6,367,566 B1 | 4/2002 | Hill |
| 6,379,146 B1 | 4/2002 | Zink et al. |
| 6,668,554 B1 | 12/2003 | Brown |
| 7,228,908 B2 | 6/2007 | East, Jr. et al. |
| 7,753,122 B2 | 7/2010 | Curlett |
| 8,322,092 B2 | 12/2012 | Isaacs |
| 8,595,998 B2 | 12/2013 | Isaacs |
| 8,596,355 B2 | 12/2013 | Kaminsky et al. |
| 8,770,284 B2 | 7/2014 | Meurer et al. |
| 8,931,553 B2 | 1/2015 | Cannan et al. |
| 9,028,171 B1 | 5/2015 | Seldner |
| 9,080,441 B2 | 7/2015 | Meurer et al. |
| 9,091,460 B2 | 7/2015 | Parrella, Sr. |
| 9,181,931 B2 | 11/2015 | McBay |
| 9,518,787 B2 * | 12/2016 | Pilebro ............... F28D 20/0039 |
| 9,709,337 B2 * | 7/2017 | Pilebro ............... F28D 20/0052 |
| 2002/0036076 A1 * | 3/2002 | Eastman ............. F28D 15/0266 165/45 |
| 2002/0179298 A1 | 12/2002 | Kopko |
| 2004/0031585 A1 | 2/2004 | Johnson, Jr. et al. |
| 2004/0251011 A1 * | 12/2004 | Kudo .................... F28D 20/00 165/172 |
| 2006/0107664 A1 * | 5/2006 | Hudson ............... F28D 20/0056 60/659 |
| 2006/0108107 A1 * | 5/2006 | Naukkarinen ........ F28D 1/0472 165/163 |

(56) References Cited

U.S. PATENT DOCUMENTS

| | | | |
|---|---|---|---|
| 2007/0017243 A1* | 1/2007 | Kidwell | C10L 3/10 165/45 |
| 2007/0023163 A1* | 2/2007 | Kidwell | F24J 3/084 165/45 |
| 2007/0125528 A1* | 6/2007 | Fakheri | F28D 1/024 165/163 |
| 2007/0158947 A1* | 7/2007 | Annen | F02B 63/04 290/1 R |
| 2008/0149573 A1* | 6/2008 | Fein | B01D 1/0011 210/799 |
| 2008/0163950 A1 | 7/2008 | Andersen et al. | |
| 2009/0020265 A1* | 1/2009 | Feinauer | F28D 1/0472 165/104.19 |
| 2009/0120090 A1* | 5/2009 | DuBois | F03D 9/002 60/641.2 |
| 2009/0120091 A1* | 5/2009 | DuBois | F03D 9/002 60/641.3 |
| 2010/0101767 A1* | 4/2010 | Furui | F24D 3/087 165/163 |
| 2010/0230071 A1 | 9/2010 | Slater | |
| 2010/0294456 A1* | 11/2010 | Taraba | F24D 3/18 165/45 |
| 2011/0041784 A1* | 2/2011 | McAlister | F01N 5/02 123/3 |
| 2011/0277470 A1 | 11/2011 | Benyaminy et al. | |
| 2012/0006503 A1 | 1/2012 | Sun et al. | |
| 2012/0030824 A1 | 2/2012 | Hoffman et al. | |
| 2012/0037335 A1* | 2/2012 | Asai | F24F 5/0046 165/45 |
| 2012/0048259 A1* | 3/2012 | Wagner | F24D 11/003 126/585 |
| 2012/0132393 A1 | 5/2012 | Pilebro et al. | |
| 2012/0149944 A1* | 6/2012 | Zmierczak | B01J 8/22 568/698 |
| 2012/0255706 A1 | 10/2012 | Tadayon et al. | |
| 2012/0318474 A1* | 12/2012 | Lieskoski | F28D 1/0472 165/45 |
| 2013/0068418 A1 | 3/2013 | Gotland et al. | |
| 2013/0112155 A1* | 5/2013 | Abdel-Rehim | F24H 1/206 122/15.1 |
| 2013/0232973 A1* | 9/2013 | McBay | F03G 7/04 60/641.2 |
| 2013/0333860 A1 | 12/2013 | Stubler | |
| 2014/0262137 A1* | 9/2014 | McBay | F24J 3/08 165/45 |
| 2014/0318737 A1* | 10/2014 | Kaasa | F28D 1/022 165/45 |
| 2015/0013949 A1* | 1/2015 | Arnot | F28D 7/022 165/156 |
| 2015/0283565 A1 | 10/2015 | Strand | |
| 2015/0292809 A1 | 10/2015 | Pilebro et al. | |
| 2015/0292810 A1 | 10/2015 | Pilebro et al. | |
| 2015/0354903 A1 | 12/2015 | Pilebro | |
| 2016/0187031 A1* | 6/2016 | McBay | F03G 7/04 165/45 |
| 2016/0201995 A1* | 7/2016 | Llena | F28D 20/0056 165/10 |
| 2016/0290681 A1* | 10/2016 | Lieskoski | F28D 1/0472 |
| 2016/0320146 A1* | 11/2016 | Hansen | F28D 7/024 |
| 2016/0334140 A1* | 11/2016 | Franck | F28D 20/0034 |

FOREIGN PATENT DOCUMENTS

| | | | |
|---|---|---|---|
| CL | 2011001016 | 4/2015 | |
| CN | 102459824 | 5/2012 | |
| CN | 102762948 | 10/2012 | |
| DE | 130466 | 4/1978 | |
| DE | 2801791 A1 * | 7/1979 | F28D 20/0052 |
| DE | 2811439 | 9/1979 | |
| DE | 10039581 | 6/2002 | |
| DE | 202006012225 | 10/2006 | |
| DE | 102007056720 | 6/2009 | |
| DE | 102008001308 | 7/2009 | |
| DE | 10 2012 211 921 A1 * | 1/2014 | F16K 17/38 |
| EP | 0198808 | 10/1986 | |
| EP | 0271319 A2 * | 6/1988 | F28D 1/0472 |
| EP | 0683362 | 11/1995 | |
| EP | 0819893 | 1/1998 | |
| EP | 2063209 | 11/2007 | |
| EP | 2141433 | 1/2010 | |
| EP | 2418449 | 2/2012 | |
| EP | 2479517 | 7/2012 | |
| FR | 2826436 A1 * | 12/2002 | F24H 1/208 |
| FR | EP 2085705 A2 * | 8/2009 | F24D 3/08 |
| FR | WO 2012168352 A1 * | 12/2012 | B01D 53/08 |
| GB | 2459955 | 11/2009 | |
| IT | EP 2031333 A2 * | 3/2009 | F28D 7/024 |
| IT | EP 2031333 A3 * | 9/2010 | F28D 7/024 |
| JP | S54128818 | 10/1979 | |
| JP | 59-231395 | 12/1984 | |
| JP | H0220799 | 5/1990 | |
| JP | 5-179852 | 7/1993 | |
| JP | H11158899 | 6/1999 | |
| JP | 2001-193897 | 7/2001 | |
| JP | 2002-173946 | 6/2002 | |
| JP | 2002173946 | 6/2002 | |
| JP | 2002-194760 | 7/2002 | |
| JP | 3648669 | 2/2005 | |
| JP | 38-21938 | 9/2006 | |
| JP | 2011-220603 | 11/2011 | |
| KR | 10-2011-0046392 | 5/2011 | |
| KR | 20120077106 | 7/2012 | |
| WO | 83/00526 | 2/1983 | |
| WO | WO8300526 | 2/1983 | |
| WO | 96/14544 | 5/1996 | |
| WO | 2007/065001 | 6/2007 | |
| WO | 2010/045011 | 4/2010 | |
| WO | 2011/016768 | 2/2011 | |
| WO | 2011/116736 | 9/2011 | |
| WO | 2013/173709 | 11/2013 | |

OTHER PUBLICATIONS

"3.5 Hydradic Gradient and Energy Gradient", 5.4-1 to 5.4-99.*
Peletier, Mark A. "Energies, gradient flows, and large deviations: a modelling point of view", Aug. 28, 2012. Version 0.2, pp. 1-31.*
De Carli, Michele and Zarella, Angelo. "Modelling and Analysis of Helical Pipe in Ground Heat Exchanger Design", GSHP Associates Technical Seminar: Truly Renewable Heating & Cooling, London, Dec. 5, 2013, pp. 1-23.*
"Iconic underground structures—TunnelTalk Iconic underground structures", Sep. 2010. [retrieved on Sep. 3, 2016]. Retrieved from the Internet:URL:<http://www.tunneltalk.com/Discussion-Forum-Sep10-Iconic-underground-structures.php>.*
Wikipedia, the free encyclopedia: "List of spiral tunnels and tunnels on a curved alignment". [retrieved on Sep. 3, 2016]. Retrieved from the Internet< URL: //https://en.wikipedia.org/wiki/List_of_spiral_tunnels_and_tunnels_on_a_curved_alignment>.*
Pells, P.J. N. The Sydney Opera House Underground Parking Station.*
Wikipedia, the free encyclopedia: "Skolithos". [retrieved on Sep. 3, 2016]. Retrieved from the Internet: URL:<https://en.wikipedia.org/wiki/Skolithos>.*
"Analysis of short helical and double U-tube borehole heat exchangers: A simulation-based comparison" (abstract). Applied Energy, Dec. 2013. Available online:Jul. 12, 2013. [retrieved on Sep. 3, 2016]. Retrieved from the Internet: <http://zj5lm7ny2a.search.serialssolutions.com/ . . . e=20131201&aulast=Zarrella,%20Angelo&spage=358&pages=358-370.*
Nash, Darren. "Goannas Dig the Deepest, Twistiest Burrows of All—Scientific American Blog Network", Jul. 6, 2015. [retrieved on Sep. 3, 2016]. Retrieved from the Internet<URL:http://blogs.scientificamerican.com/tetrapod-zoology/goannas-dig-the-deepest-twistiest-burrows-of-all/.*
"Tracing large tetrapod burrows from the Permian of Nei Mongol, China", Chinese Academy of Sciences, Dec. 31, 2013. [retrieved on Sep. 3, 2016]. Retrieved from the Internet<URL: http://phys.org/news/2013-12-large-tetrapod-burrows-permian-nei.html>.*

(56) References Cited

OTHER PUBLICATIONS

Extended European Search Report, European Application No. 13851337, mailed Dec. 17, 2015 (2 pages).
Extended European Search Report, European Application No. 13852022.6, mailed Oct. 28, 2015 (3 pages).
First Office Action for Chilean Application No. 2015-001142, dated Jun. 15, 2017 (11 pages).

* cited by examiner

ENERGY STORAGE ARRANGEMENT HAVING TUNNELS CONFIGURED AS AN INNER HELIX AND AS AN OUTER HELIX

This application claims benefit from International Application No. PCT/SE2013/051279, which was filed on Nov. 1, 2013, which claims priority to Swedish Patent Application No. 1251238-0, which was filed Nov. 1, 2012, the entireties of said patent applications are incorporated herein by reference.

FIELD OF THE INVENTION

The present invention relates to an arrangement for storing thermal energy, comprising at least two tunnels for holding a fluid.

BACKGROUND OF THE INVENTION

There is a need for efficient storage of thermal energy within the area of modern energy technology.

Thermal energy may advantageously be stored in a fluid, such as e.g. water, above ground in insulated tanks, in ground in insulated pits, or underground in excavated caverns, using the surrounding ground as insulation. The thermal energy of the fluid is preserved to a great extent during an extended period of time. Today, these methods are used in different parts of the world in order to satisfy the need for storing thermal energy between different seasons, e.g. storing temporary surplus heat which is used later on when there is a demand for it and, preferably, when its financial value is higher. The main transition of energy is from the summer half, when there is less need for heating, to the winter half, when the need for heating is much higher. However, there is also much to gain by using the storage for short-term variations and always actively storing surplus heat. These kinds of storages may also be used for storage of a colder fluid, to be used for cooling, as well as for fluid having an intermediate temperature, such as a fluid used in low temperature systems.

As mentioned above, it is a common solution to store thermal energy in a fluid located in a cavern, utilizing the surrounding ground as insulation. This has the advantages of a large storage capacity per unit volume and the possibility of withdrawing a large output from the storage. Hence, this kind of storage is suitable both for short and long term storage. However, there are also substantial disadvantages such as high investment costs.

A further solution is to use a storage comprising a large number of vertically extending and evenly distributed channels. Hot water is circulated through the channels, and the ground itself stores the thermal energy. This has the advantages of low investment costs and the fact that it can be used in ground of differing quality. However, the slow speed for transporting heat through the ground is a huge disadvantage, since high storage and withdrawal speeds are impossible. Hence, this kind of storage is mostly suitable for long term storage, i.e. storage between seasons. The thermal losses to the surrounding ground and the atmosphere are in this case considerable due to a relatively large surrounding area compared to the enclosed storage volume. In this type of storage, pipes and pump arrangements for circulation of liquid are installed for injection and retrieval of energy. A considerable amount of additional electric energy is therefore required for these operations, reducing the efficiency of the storage substantially.

Swedish patent application 0950576-9 discloses one kind of efficient storage of thermal energy. However, there is still a need for an even more improved arrangement for storing thermal energy underground.

SUMMARY OF THE INVENTION

An object according to an aspect of present invention is to provide an environmentally friendly arrangement for storing thermal energy underground, in which arrangement overall thermal energy losses can be reduced. A further object is to provide an improved arrangement for storing thermal energy.

According to a first aspect of the present invention, these objects are achieved by an arrangement for storing thermal energy, comprising at least two tunnels for holding a fluid, wherein the tunnels are connected to each other by at least one channel, such that fluid communication is allowed between the tunnels, and wherein each tunnel extends at least partially along a respective circular arc.

By such an arrangement, one accomplishes an effective thermal storage which can be operated in many different areas at once. Further, this kind of combination storage combines the advantages of a cavern storage with the advantages of a channel storage, i.e. the relatively cheap seasonal storage capacity of a channel storage is combined with the possibilities of retrieving large output and providing/retrieving heat quickly to/from a cavern storage. Also, the use of two tunnels facilitates covering a larger volume of the ground with storage space, and it facilitates the use of a larger number of channels.

The tunnels may comprise an inner tunnel and an outer tunnel, wherein the outer tunnel is arranged around the tunnel. The use of an outer and an inner tunnel facilitates excavating the storage.

In one embodiment, each tunnel is configured as a helix, the two tunnels forming an inner and an outer helix wherein the outer helix is arranged around the inner helix. The helix shape further facilitates excavating the storage.

In one embodiment, the arrangement further comprises at least one shaft. The use of a shaft significantly facilitates the extraction and return of fluid into the storage.

The tunnels may be connected to each other and/or to the shaft by at least one passage, such that fluid communication is allowed between the tunnels and/or the shaft. A further advantage to using such passages is that the construction of the very large storage is simplified.

In one embodiment, the tunnels are connected to the shaft by at least one channel, such that fluid communication is allowed between the tunnels and the shaft, magnifying the advantages of the combination storage.

The centre axis of the inner and/or the outer helixes and/or the at least one shaft extends essentially in a vertical direction.

In one embodiment, the at least one passage is arranged at an angle relative a horizontal plane allowing thermal natural convection.

In yet another embodiment, the channels are arranged at an angle relative a horizontal plane allowing thermal natural convection.

The tunnels may be arranged at least partially at different vertical levels, further facilitating thermal natural convection.

In one embodiment, the tunnel forming the inner helix has a greater inclination than the tunnel forming the outer helix, such that each turn of each helix extends essentially parallel to the other helix but at a different vertical level.

The passages may be arranged such that they are not located directly above each other in a vertical direction, such that it is possible to drill a channel from the top of the storage down to each individual passage, without piercing another passage.

In one embodiment, the middle section of the arrangement has larger dimensions than at least one end section of the arrangement, as seen in the direction of its centre axis. When both end sections of the arrangement are smaller than the middle section, the storage has an essentially spherical shape. The use of such a generally spherical shape, comprising both tunnels and the intermediate ground, minimizes the peripheral area of the storage and hence the heat loss, while still achieving an as large volume within the periphery of the storage as possible. When only one end section is smaller, then the shape essentially corresponds to a cone or a pyramid, as seen in the direction of the centre axis of arrangement.

The fluid may be chosen from a group comprising: water, a mixture of water and a coolant, any liquid fuels, such as hydro carbons of fossil origin or biological origin (bio fuel), salt solution, ammonia, or other refrigerants.

The arrangement may comprise at least one fluid communication means arranged to extract an arbitrary portion of fluid from the tunnels and/or the shaft at a suitable vertical level so as to allow processing of the fluid by means of at least one heat exchanger, wherein the fluid communication means further is arranged to return processed fluid to the tunnels and/or the shaft at a suitable vertical level.

In one embodiment, the arrangement further comprises an energy source coupled to the heat exchanger, which heat exchanger is arranged to increase or decrease the thermal energy of the fluid.

Further, the energy source may be any of a group of energy sources comprising an industrial facility or other sources of waste heat, a combined heat and power plant (CHP), solar panels for heating or for combined electrical generation and heating, a heat pump, a bio fuel boiler, an electrical heater, or a fossil fuel boiler.

BRIEF DESCRIPTION OF THE DRAWINGS

This and other aspects of the present invention will now be described in more detail, with reference to the appended drawings showing a currently preferred embodiment of the invention.

DETAILED DESCRIPTION

Figure 1:
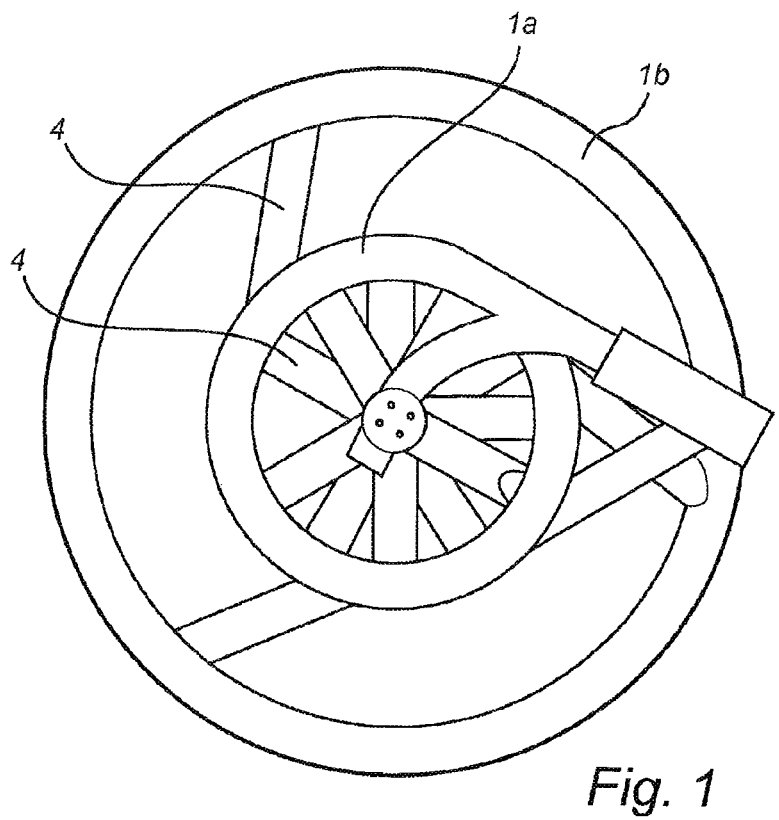
FIG. 1 shows a top view of a thermal storage according to the present invention.
Figure 2:
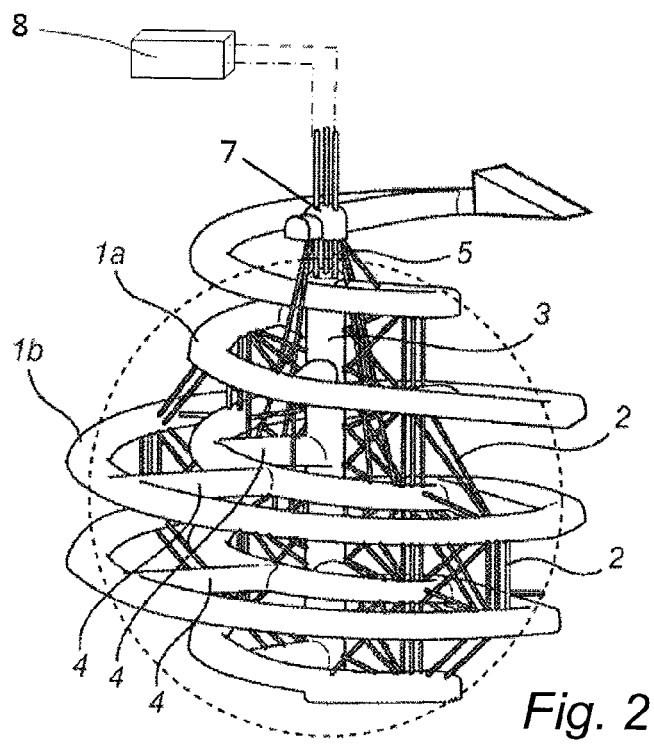
FIG. 2 shows a side view, with aspects shown schematically, of an embodiment of the thermal storage according to FIG. 1.

FIGS. 1 and 2 show an embodiment of an arrangement for storing thermal energy underground which combines a cavern storage, for storing a part of the energy in a fluid such as water, and a channel storage, for storing a part of the energy in the ground. The energy which is stored comes primarily from existing production facilities which are connected to a district heating system, such as combined heat and power plants. Other possible thermal energy generators are, e.g., solar collectors and industrial waste heat.

This kind of energy storage can be used for storage of hot fluid, e.g. up to 95° C., and cold fluid, e.g. down to 4° C., as well as fluid having an intermediate temperature. Intermediate temperature means a temperature which is significantly lower than the hottest fluid which can be stored, but which is higher than the coldest fluid which can be stored, as well. Intermediate temperature fluid is to be used, e.g., in low temperature systems. Fluid having an intermediate temperature of for example 40-70° C. is usually a fluid being returned back into the storage after heat exchange to a district heating system.

When storing thermal energy in the ground, layering occurs in the storage, if the storage space has a sufficiently large volume, due to the differences in density between volumes of fluid having different temperatures. The warmer the fluid, the higher up in the storage it is located.

When charging the storage with hot fluid, cold fluid from a lower layer of fluid is circulated up through the storage and past a heat exchanger where it is heated. Thereafter it is supplied to the layer of fluid in the storage which has the corresponding, higher temperature. The process is reversed during discharge, i.e. hot fluid from an upper layer is circulated to the heat exchanger where it releases its energy where after it is returned to the layer of storage which has the corresponding, lower temperature.

When charging the storage with cold fluid, hot fluid from a higher layer of fluid is circulated up through the storage and past a heat exchanger where it is cooled off. Thereafter it is supplied to the layer of fluid in the storage which has the corresponding, lower temperature. The process is reversed during discharge, i.e. cold fluid from a lower layer is circulated to the heat exchanger where it absorbs energy where after it is returned to the layer of storage which has the corresponding, higher temperature.

A combination storage such as that of the present invention combines the advantages of a cavern storage with the advantages of a channel storage. The basic idea is to use the relatively cheap seasonal storage capacity of a channel storage together with the possibilities of withdrawing large output and providing/retrieving heat quickly to/from a cavern storage. The storage capacity of the storage is further increased due to the increase in contact area between fluid and ground.

As shown in FIG. 2, the storage comprises at least two tunnels 1a, 1b and one shaft 3 for holding a fluid, and is essentially spherical in shape and essentially centred around the centre axes of the tunnels 1a, 1b and the shaft 3. The generally spherical shape is chosen to minimise the circumferential area, and hence the heat losses, of the storage, while still achieving an as large volume within the storage as possible. Its construction is described in more detail below.

The shaft 3 is preferably arranged at the centre of the sphere, such that it extends essentially in a vertical direction along a vertically extending centre axis of the sphere, and through the entire vertical height of the sphere. However, it can also be somewhat displaced in comparison to the vertical centre axis of the sphere, and it may also be somewhat inclined compared to the vertical direction.

Each tunnel 1a, 1b circumscribes the shaft 3, i.e. extend at least partially along a respective circular arc. The tunnels 1a, 1b are essentially circular as seen in a plane being perpendicular to the direction of the centre axis of the shaft 3, i.e. have a ring shape. The tunnels 1a, 1b could also have a more angular shape, being essentially elliptical or polygonal as seen in the previously mentioned plane. However, the principal shape of the tunnels 1a, 1b is still that of an arc.

The tunnels 1a, 1b are arranged within each other such that they form at least one inner tunnel 1a and at least one outer tunnel 1b, respectively, and such that they each have a centre axis which preferably is coaxial with the centre axis of the shaft 3, i.e., the at least one outer tunnel 1b is arranged around, and outside, the at least one inner tunnel 1a. However, the tunnels 1a, 1b may be arranged such that their respective centre axis is not coaxial with the centre axis of the shaft. The centre axes of the tunnels may extend essentially in a vertical direction or be somewhat inclined compared to the vertical direction.

The tunnels 1a, 1b are connected to each other and/or to the shaft by a number of passages 4, such that fluid communication is allowed between the tunnels 1a, 1b themselves and the shaft 3.

Figure 5:
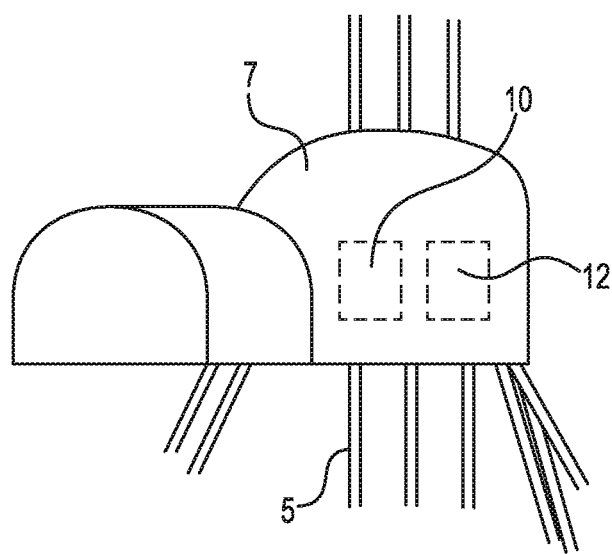
FIG. 5 shows a detailed schematic view of the processing area of the embodiment of the thermal storage according to FIG. 2.

Hence, the entire storage space is made up of a number of individual storage sections such as e.g. the shaft, the tunnels, and the passages. The storage needs to have a certain volume in order to facilitate both layering of fluid, i.e. vertical temperature stratification, and thermal natural convection within the storage. Processing area 7 is connected to shaft 3 and/or tunnels 1a, 1b. As schematically shown in FIG. 5, processing area 7 comprises heat exchanger 10 and pumps 12. Energy source 8 is shown schematically, and is operatively connected to heat exchanger 10 in processing area 7.

Each passage 4 extends either between the outer tunnel 1b and the inner tunnel 1a, or between the inner tunnel 1a and the shaft 3. The storage comprises a number of passages 4 distributed such that each tunnel has at least one passage 4 between the outer tunnel 1b and the inner 1a tunnel and at least one passage 4 between the inner tunnel 1a and the shaft 3. The passages 4 may be arranged such that they are not located directly above each other in the vertical direction, i.e. making it possible to drill a hole from the top of the storage down to each individual passage 4, without having to pierce through another passage. Further, the passages 4 can be arranged at an angle relative the horizontal plane, in order to allow thermal natural convection. In one embodiment, the passages 4 which are connected to the shaft 3 extend completely in the horizontal plane, while the passages 4 which connect the tunnels 1a, 1b to each other are inclined. The passages 4 may further be arranged such that they extend radially outwards towards the periphery of the storage as seen from the shaft 3. However, the passages 4 may be angled such that they extend in the tangential direction of the arched tunnel in question, or at any other suitable angle.

Figure 3:
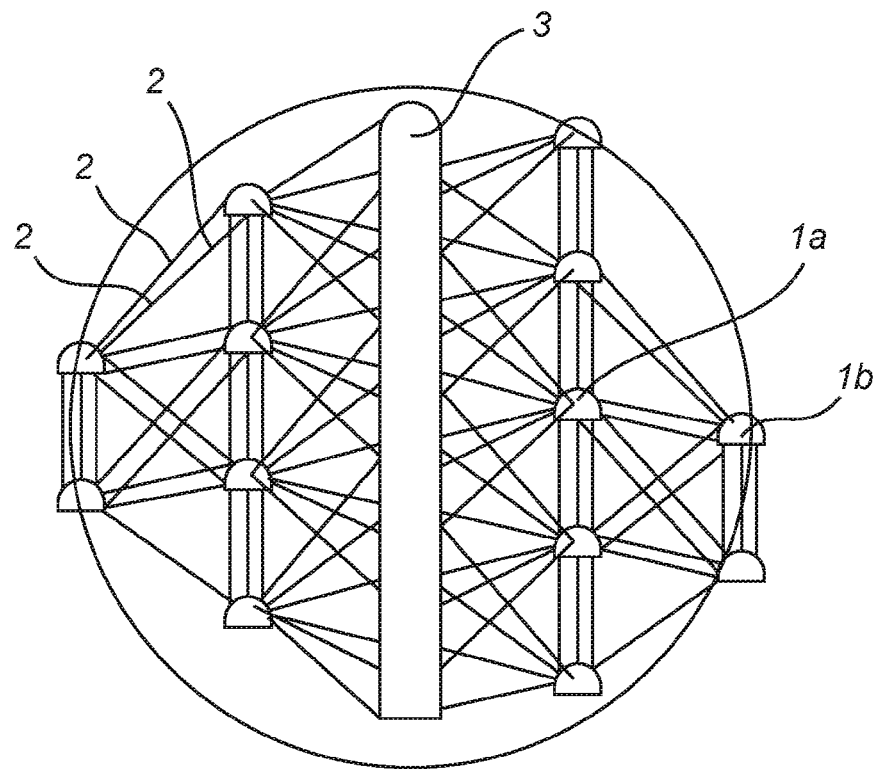
FIG. 3 shows a schematic cross sectional view of an embodiment of the thermal storage according to FIGS. 1 and 2.

As shown more clearly in FIG. 3, the tunnels 1a, 1b are also connected to each other and/or to the shaft 3 by a number of channels 2, such that fluid communication is allowed between the tunnels 1a, 1b themselves and between the tunnels 1a, 1b and the shaft 3. The channels 2 may be arranged as bore holes or pipes. The ground within the sphere, i.e. the ground located essentially inside the outermost periphery of the storage, is pierced by a large number of such channels 2, i.e. they are arranged in a tight pattern in between the tunnels 1a, 1b and the shaft 3. Hence, the channels 2 are preferably much smaller in dimensions and are arranged in much higher numbers than the passages 4, since the plurality of smaller channels 2 are intended to form a tight pattern as opposed to the fewer, larger passages 4. The channels 2 are arranged with some inclination, i.e. arranged at an angle, in relation to the horizontal plane, in order to allow thermal natural convection by gradient flow. The inclination of the channels 2 may, e.g., be between 1:10 and vertically relative the horizontal plane, or less, to prevent pockets of air to disturb the natural convection.

In one embodiment, the storage may comprise a number of inner tunnels 1a and a number of outer tunnels 1b, each tunnel 1a, 1b being configured as a closed loop which is essentially separated from the other tunnels 1a, 1b. As a figurative example, each tunnel has the shape of a donut. In this embodiment, the inner tunnels 1a are arranged at a distance from each other in the vertical direction. There are preferably more than two such inner tunnels 1a, and they all have the same dimensions, i.e. radius. A number of outer tunnels 1b are also arranged at a distance from each other in the vertical direction. There are preferably fewer such outer tunnels 1b than inner tunnels 1a, and the outer tunnels 1b all have the same radius, which is larger than that of the inner tunnels 1a. The inner tunnels 1a are preferably arranged along the entire vertical height of the shaft 3 between the very ends of the shaft 3, while the outer tunnels 1b are arranged at a distance from the very ends of the shaft 3 such that the outer tunnels 1b are restricted to surrounding only a middle section of the shaft 3. This way, the middle section of the storage has larger dimensions, i.e. a larger radius, than its end sections, as seen in a plane perpendicular to the centre axes of the shaft 3, such that the generally spherical shape of the storage is achieved. However, it is sufficient if one of the upper or lower end sections of the storage, as seen in the above mentioned plane, has smaller dimensions than the middle section of the storage such that the storage has more the shape of a cone or a pyramid than a sphere. Further, the inner tunnels 1a and the corresponding outer tunnels 1b are preferably somewhat offset in relation to each other in the vertical direction, i.e. arranged at different vertical levels.

In other words, the above described embodiment comprises an arrangement for storing thermal energy comprising at least one inner tunnel 1a and at least one outer tunnel 1b for holding a fluid. The inner and outer tunnels 1a, 1b are connected to each other by at least one channel 2, such that fluid communication is allowed between the tunnels 1a, 1b, and each tunnel 1a, 1b is essentially circular and forms a closed loop. Further, the outer tunnel 1b is arranged around the inner tunnel 1a.

However, in a preferred embodiment each tunnel 1a, 1b is configured as a helix, extending around the shaft 3 along the vertically extending centre axis of the sphere. The helixes 1a, 1b are arranged within each other such that they form an inner helix 1a and an outer helix 1b, respectively, and they each have a centre axis which preferably is coaxial with the centre axis of the shaft 3, i.e., the outer helix 1b is arranged around, and outside, the inner helix 1a. The inner helix 1a and the outer helix 1b together form the outer periphery of the generally spherical shape.

In a preferred embodiment, the inner helix 1a extends along the entire vertical height of the shaft 3 between the very ends of the shaft 3, while the outer helix 1b begins and ends a distance from the very ends of the shaft 3 such that the outer helix 1b is restricted to surrounding a middle section of the shaft 3. This way, the middle section of the storage has larger dimensions, i.e. a larger radius, than its end sections, as seen in a plane perpendicular to the centre axes of the helixes 1a, 1b, such that the generally spherical shape of the storage is achieved. However, it is sufficient if one of the upper or lower end sections of the storage, as seen in the above mentioned plane, has smaller dimensions than the middle section of the storage such that the storage has more the shape of a cone or a pyramid than a sphere. Hence, one or both helixes 1a, 1b may extend along the vertical height of the shaft 3 to one or both end(s) of the shaft 3, if so desired.

Further, the helixes 1a, 1b need not be located within each other nor share a centre axis with each other or the shaft 3, i.e., other embodiments than the above described are possible.

Each turn of the respective helix 1a, 1b is essentially circular as seen in the plane being perpendicular to the direction of the centre axis of the helix 1a, 1b. However, the helix 1a, 1b could also have a more angular shape, each turn of the helix being essentially elliptical or polygonal as seen in the plane being perpendicular to the direction of the centre axis of the helix 1a, 1b.

In this embodiment, the passages 4 are distributed such that each tunnel turn has at least one passage 4 between the outer tunnel 1b and the inner 1a tunnel and at least one passage 4 between the inner tunnel 1a and the shaft 3.

As mentioned above, the tunnels 1a, 1b are preferably arranged within each other such as to form an inner helix 1a and an outer helix 1b. In a preferred embodiment, the corresponding turns of each helix 1a, 1b are somewhat offset in relation to each other in the vertical direction. In other words, the helixes 1a, 1b are spun in the same direction and each turn of the inner helix 1a is located at a different vertical level compared to a corresponding turn of the outer helix 1b. In order to achieve this, the inner helix 1a preferably has a greater inclination than the outer helix 1b. The inclination of the inner helix 1a is, e.g., 1:8 while the inclination of the outer helix 1b is 1:16, i.e. the outer helix 1b has half the inclination of the inner helix 1a if the radius of the outer helix 1b is twice the radius of the inner helix 1a.

However, the helixes 1a, 1b could also have a different configuration such as being spun in opposite directions, corresponding to the double helix of the DNA structure. They might still have a common centre axis which is coaxial with the centre axis of the shaft 3 even though it is not necessarily so.

The fluid used in the storage is preferably water, but could be, e.g., a mixture of water and a coolant, any liquid fuels such as hydro carbons of fossil origin or biological origin (bio fuel), a salt solution, ammonia, or other refrigerants.

The process equipment connected to the storage is arranged in a processing area, and comprises among other things heat exchangers and pumps.

As mentioned above, the fluid in the upper parts of the storage has higher temperatures than the fluid in the lower parts. There are also fluid layers having intermediate temperatures in the transition zones there between. In order to use the full potential of the storage, it is important to use the different, available temperatures effectively. One condition is that the storage is provided with inlets and outlets at different heights. Hence, there are a number of fluid communication means 5, e.g. telescopic pipes, which run from the processing area and down through the shaft 3, and which are arranged to extract a portion of fluid from the shaft 3 at a suitable vertical level so as to allow processing of the fluid by means of at least one heat exchanger. The fluid communication means 5 are further arranged to return processed fluid to the shaft 3 at a suitable vertical level.

The storage further comprises an energy source coupled to the heat exchanger, which heat exchanger is arranged to increase or decrease the thermal energy of the fluid, depending on the application. The storage can be used both for heating, i.e. the fluid which is returned to the storage has a lower temperature than when it was extracted, and for cooling, i.e. the fluid which is returned to the storage has a higher temperature than when it was extracted. The energy source is, e.g., an industrial facility or other sources of waste heat, a combined heat and power plant (CHP), solar panels for heating or for combined electrical generation and heating, a heat pump, a bio fuel boiler, an electrical heater, or a fossil fuel boiler.

Figure 4:
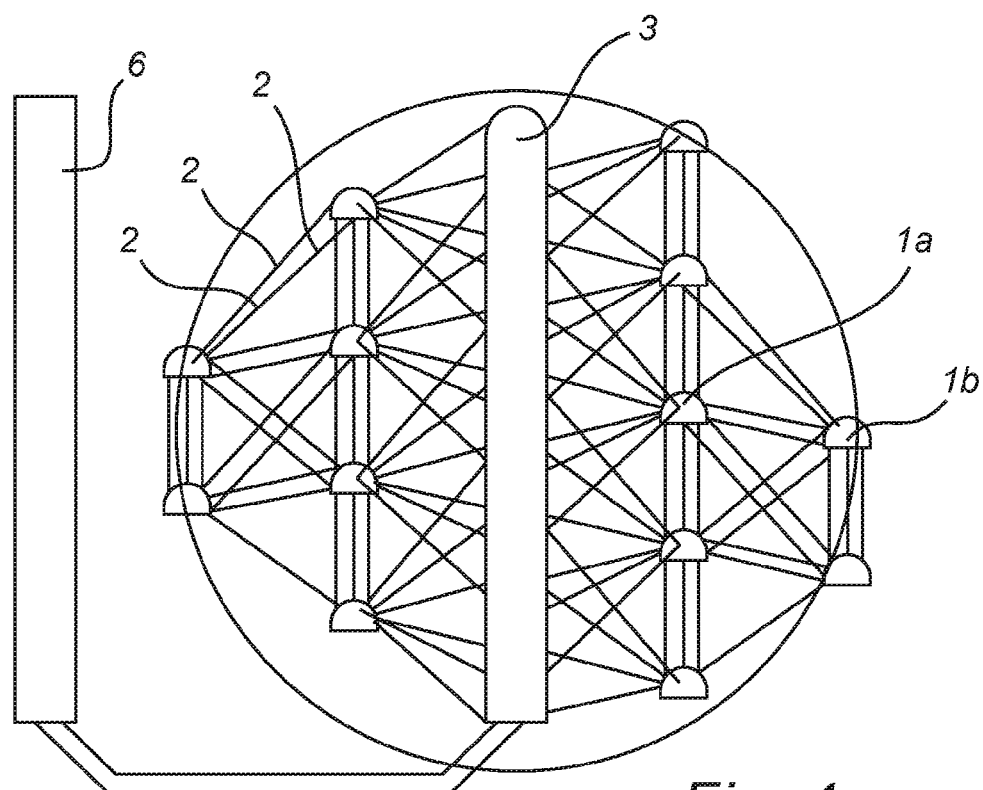
FIG. 4 shows yet another embodiment of a thermal storage according to the present invention.

As seen in FIG. 4, the storage may be provided with a second shaft 6 located outside the spherical storage, but extending essentially in parallel with the first shaft 3. The second shaft 6 is connected to the bottom of the spherical storage, such that cold fluid can be stored or withdrawn from the storage without passing through the upper parts of the storage, hence being a part of the storage while still avoiding unnecessary cooling of the storage. Further, the shaft 6 may comprise a second energy storage such as that shown in FIG. 3, being a cold storage for, e.g., ice, snow, water, or rock energy storage. In this embodiment, if water is used, the order of the layers having different temperatures is changed as compared to the previously discussed embodiments. The heaviest water, at 4° C., is located at the very bottom of the storage, while ice, having a lower density than water, is located at the very top of the storage, floating on top of the water. Water at approximately 0° C. is located in between the ice and the 4° C. water.

The person skilled in the art realizes that the present invention by no means is limited to the preferred embodiments described above. On the contrary, many modifications and variations are possible within the scope of the appended claims.

The invention claimed is:

1. An arrangement for storing thermal energy, comprising:
   at least two tunnels (1a, 1b) holding a liquid; and
   a heat exchanger;
   wherein one or more of said at least two tunnels are connected to said heat exchanger such that fluid communication is allowed from said at least two tunnels to said heat exchanger;
   wherein said at least two tunnels (1a, 1b) are connected to each other by a plurality of channels (2), such that fluid communication is allowed between said at least two tunnels (1a, 1b), said plurality of channels (2) being arranged in a pattern in between said at least two tunnels (1a, 1b),
   wherein said at least two tunnels (1a, 1b) comprise an inner tunnel (1a) and an outer tunnel (1b),
   wherein each of the inner tunnel (1a) and the outer tunnel (1b) is configured as a helix, the inner tunnel (1a) forming an inner helix and the outer tunnel (1b) forming an outer helix, and
   wherein the outer helix is arranged around the inner helix.

2. The arrangement according to claim 1, wherein said at least two tunnels (1a, 1b) are connected to each other by at least one passage (4), such that fluid communication is allowed between said at least two tunnels (1a, 1b).

3. The arrangement according to claim 2, wherein said at least one passage (4) is arranged at an angle relative to a horizontal plane, thereby allowing thermal natural convection.

4. The arrangement according to claim 2, wherein said at least two tunnels (1a, 1b) are connected to each other by a plurality of passages being are arranged such that the plurality of passages are not located directly above each other in a vertical direction.

5. The arrangement according to claim 1, wherein said plurality of channels (2) are arranged at an angle relative to a horizontal plane, thereby allowing thermal natural convection.

6. The arrangement according to claim 1, wherein each turn of the inner helix corresponds to a turn of the outer helix, wherein corresponding turns of the inner and the outer helix are offset in relation to each other in a vertical direction.

7. The arrangement according to claim 1, wherein the inner tunnel forming the inner helix has a greater inclination than the outer tunnel forming the outer helix.

8. The arrangement according to claim 1, wherein said fluid is selected from the group consisting of: water, a mixture of water and a coolant, a liquid fuel, salt solution, ammonia, and other refrigerants.

9. The arrangement according to claim 1, wherein the liquid fluid in the arrangement is disposed in layers of vertical temperature stratification, the arrangement further comprising at least one fluid communication telescopic pipe (5) arranged to extract a portion of said fluid from the at least two tunnels (1a, 1b) and/or the at least one shaft (3) at a vertical level corresponding to a first fluid temperature, wherein said at least one fluid communication telescopic pipe (5) further is arranged to return fluid to the at least two tunnels (1a, 1b) and/or the at least one shaft (3) at a vertical level corresponding to a second fluid temperature.

10. The arrangement according to claim 9, further comprising an energy source coupled to said heat exchanger, wherein the heat exchanger is arranged to increase or decrease the thermal energy of the fluid.

11. The arrangement according to claim 10, wherein said energy source is selected from the group of energy sources consisting of: an industrial facility or other sources of waste heat, a combined heat and power plant, solar panels for heating or for combined electrical generation and heating, a heat pump, a bio fuel boiler, an electrical heater, and a fossil fuel boiler.

12. The arrangement of claim 1, wherein the inner helix and the outer helix define an outer periphery of the arrangement, wherein the outer periphery has a spherical shape.

13. An arrangement for storing thermal energy, comprising:

at least two tunnels (1a, 1b) holding a liquid, wherein said at least two tunnels (1a, 1b) are connected to each other by a plurality of channels (2), such that fluid communication is allowed between said at least two tunnels (1a, 1b), said channels being arranged in a pattern in between said at least two tunnels (1a, 1b), and a heat exchanger;

wherein said at least two tunnels (1a, 1b) comprise an inner tunnel (1a) and an outer tunnel (1b), and wherein each of the inner tunnel (1a) and the outer tunnel (1b) is configured as a helix, the inner tunnel (1a) forming an inner helix and the outer tunnel (1b) forming an outer helix, and wherein the outer helix is arranged around the inner helix;

at least one shaft (3), wherein said at least two tunnels (1b, 1b) are connected to said at least one shaft (3) by at least one of said plurality of channels (2) and/or at least one passage (4), such that fluid communication is allowed between said at least two tunnels (1a, 1b) and said at least one shaft (3); and wherein one or more of said at least two tunnels and/or said shaft are connected to said heat exchanger such that fluid communication is allowed from said at least two tunnels and/or said shaft to said heat exchanger.

14. The arrangement according to claim 13, wherein a center axis of at least one of said inner tunnel (1a) or said outer tunnel (1b) or said at least one shaft (3) extends in a vertical direction.

15. The arrangement according to claim 13, wherein said at least one shaft has a first end section, a second end section, and a middle section extending between the first end section and the second end section, wherein the inner helix is arranged to surround the first end section, the middle section and the second end section of the at least one shaft, and wherein the outer helix is arranged to surround the middle section of the at least one shaft.

16. The arrangement according to claim 13, further comprising a second shaft (6) being connected to a bottom of said at least one shaft.

* * * * *